United States Patent [19]
Poole et al.

[11] 4,101,839
[45] Jul. 18, 1978

[54] ANALOG-DIGITAL RATIO DETECTOR

[75] Inventors: Lynn A. Poole; Harry M. Crain, both of State College, Pa.

[73] Assignee: The United States of America as represented by the Secretary of the Navy, Washington, D.C.

[21] Appl. No.: 527,666

[22] Filed: Nov. 27, 1974

[51] Int. Cl.² .............................................. H03B 1/00
[52] U.S. Cl. ..................................... 328/165; 307/358; 307/359; 328/151; 328/162
[58] Field of Search ........................ 328/151, 162, 165; 343/7 A; 307/358, 359

[56] References Cited

U.S. PATENT DOCUMENTS

| | | | |
|---|---|---|---|
| 3,500,396 | 3/1970 | Lampert et al. | 343/7 A |
| 3,505,637 | 4/1970 | Abruzzo | 343/7 A X |
| 3,582,872 | 6/1964 | Prager | 343/7 A X |
| 3,761,922 | 9/1973 | Evans | 343/7 A |
| 3,815,032 | 6/1974 | Parker et al. | 328/151 X |

Primary Examiner—S. C. Buczinski
Attorney, Agent, or Firm—R. Sciascia; R. Beers; S. Sheinbein

[57] ABSTRACT

A combined analog and digital ratio detector circuit produces a gated output whenever the average amplitude of an information pulse exceeds a fixed preset threshold in the presence of an interfering noise background. The circuit also has the capability of tracking the average value of the noise to null it out, thereby maintaining the preset signal-to-threshold ratio over a wide range of slowly varying noise amplitudes.

The circuit's functional breakdown is as follows: (1) an input operational amplifier has a time constant related to the information pulse duration; (2) a noise voltage tracking and nulling loop has a time constant related to the background noise characteristics; (3) a logic interface between a system clock and a counter (part of item 2) prevents "racing"; and (4) an adjustable threshold gate sets the false alarm rate at an acceptable information retrieval probability.

5 Claims, 12 Drawing Figures

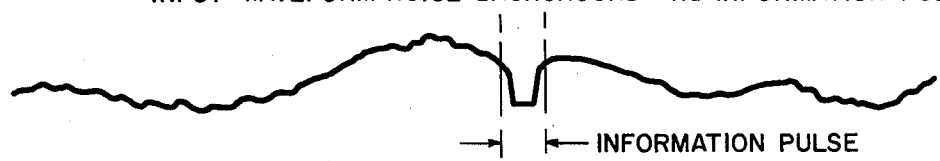

INPUT WAVEFORM-NOISE BACKGROUND AND INFORMATION PULSE

← INFORMATION PULSE

FIG. 2a

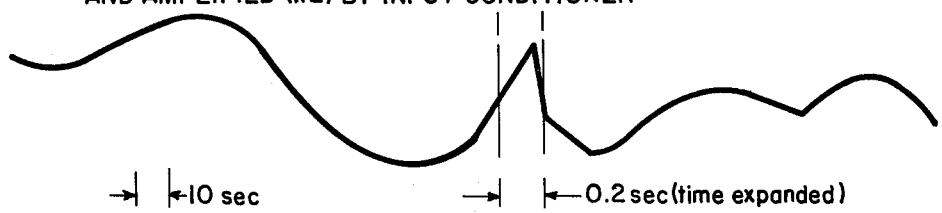

WAVEFORM I, INVERTED, SMOOTHED WITH 0.2-sec TIME CONSTANT AND AMPLIFIED (x2) BY INPUT CONDITIONER →| |←10 sec    →| |←0.2 sec (time expanded)

FIG. 2b

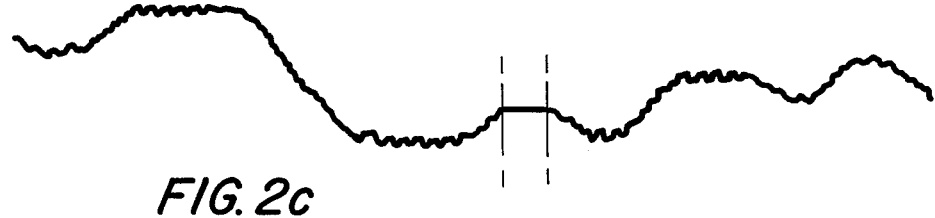

INPUT CURRENT WAVEFORM TO BUFFER AND SMOOTHING AMPLIFIER 66

FIG. 2c

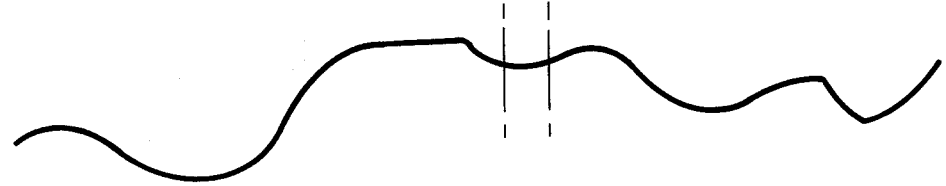

OUTPUT OF AMPLIFIER 66

FIG. 2d    SUM OF WAVEFORMS b AND d    HOLD OFF THRESHOLD OF L

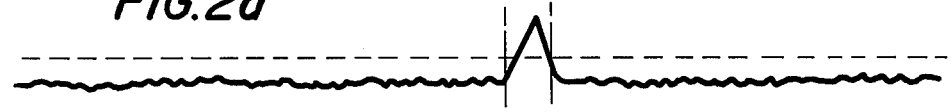

FIG. 2e    OUTPUT OF AMPLIFIER 124

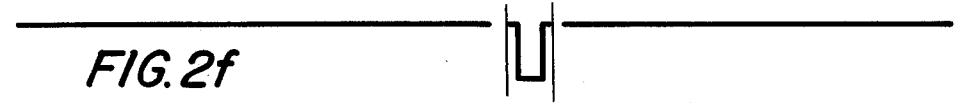

FIG. 2f

OUTPUT OF BUFFER LOGIC 134

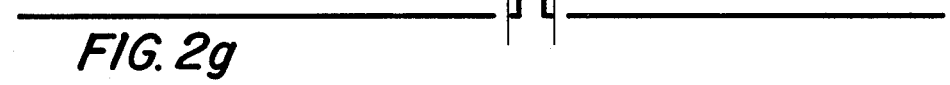

FIG. 2g

ANALOG-DIGITAL RATIO DETECTOR

BACKGROUND OF THE INVENTION

The present invention relates, generally to a combined analog-digital circuit for detecting the ratio of the average amplitude of an input information pulse with respect to a predetermined threshold, and more particularly, to a detector circuit which provides a digital output when the input signal to the detector exceeds a predetermined ratio of the long term average of the input level.

The analog-digital ratio detector of the present invention is designed to be used in conjunction with a band limited log receiver. The input for the detector is normally 0 to −2.0 volts and corresponds to an input signal level for the receiver system. The ratio detector can operate for either linear or log input characteristics. The properties of the log receiver are such that a constant ratio change in input level will generate a fixed output level change that is independent of the input magnitude. Therefore a ratio detector for a log receiver system detects a fixed change in input level which is independent of the magnitude of the average input level. If the ratio detector is to operate for linear input signals the threshold must become a function of the average input magnitude.

Prior ratio detectors used in this environment generally employ resistor-capacitor (RC) networks in the integration portion of the detector circuit. The inherent capacitor leakage in the RC network restricts the integration time to shorter periods and thus inhibits a precise determination of the threshold used in establishing the ratio. In addition, RC integrators increase the size requirements for the ratio detector when compared to the present invention since the RC network requires large, high quality capacitors for comparable integration times, and these capacitors add appreciably to the cost of manufacturing the detector.

SUMMARY OF THE INVENTION

The present circuit utilizes both analog and digital techniques consistent with achieving a desired stability, resolution, size, and economy. Short pulse information signals are adequately processed by a conventional operational amplifier configuration, while the slowly varying background noise is uniquely processed by combining both analog and digital techniques to accommodate the long time constants involved. As its primary function, the analog-digital ratio detector circuit provides a digital output when the input signal to the detector exceeds a predetermined ratio of the long term average of the input level.

OBJECTS OF THE INVENTION

It is an object of the invention to provide a ratio detector circuit which utilizes both analog and digital techniques to achieve improved stability, resolution and economy.

Another object of the invention is to obtain longer integration times than are feasible with resistance-capacitor networks used in prior ratio detectors.

Another object of the invention is to more precisely determine the threshold level used to establish the ratio between the information pulse and the background noise.

Another object of the invention is to reduce the cost and size of the ratio detector by eliminating the need for large, high quality capacitors in the integrator circuit.

BRIEF DESCRIPTION OF THE DRAWINGS

Other objects, advantages and novel features of the present invention will become apparent from the following detailed description of the invention when considered in conjunction with the accompanying drawings, in which:

FIGS. 2a-2g graphically illustrate the signal waveforms a through g at various points in the circuit of FIG. 1.

DETAILED DESCRIPTION

Figure 1:
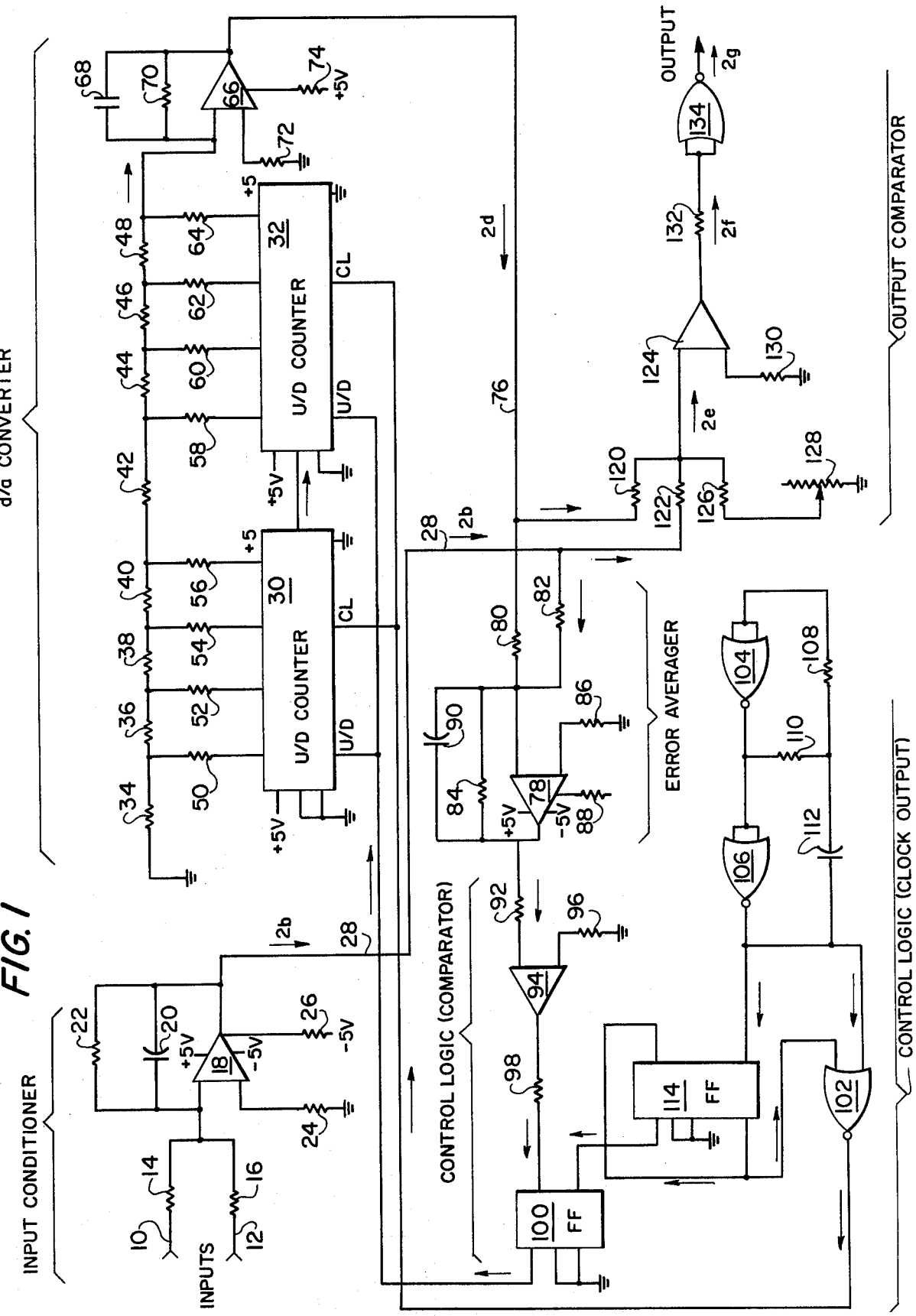
FIG. 1 is a schematic diagram of a ratio detector circuit construction in accordance with the present invention.
Figure 3A:
FIGS. 3a-3d comprise a timing diagram at various points in the clock circuit portion of FIG. 1.
Figure 3B:
Figure 3C:
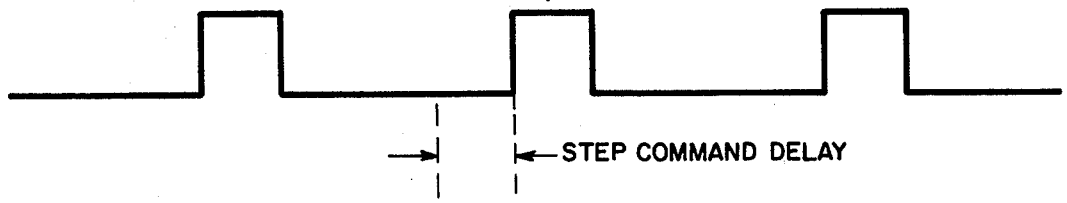
Figure 3D:
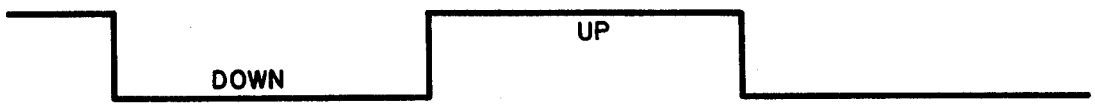

The circuit of FIG. 1 demonstrates operating principals of the present invention. However, it should be understood that other clock rates, expanded ladder and counter combinations, and different scaling and/or smoothing amplifiers can be combined to meet more stringent requirements.

Basically, the ratio detector of FIG. 1 consists of three basic components; the input conditioning stage (upper left of FIG. 1), feedback circuitry for establishing an average of the input signal, and an output comparator stage (lower right of FIG. 1) for detecting the amplitude relationship between the input signal and its long term average. Within the input conditioning stage, the input signal is conducted via either input line 10 or 12 through associated equal value resistors 14 and 16 to an inverting operational amplifier 18 (OP-AMP) which inverts the input signal so that it has a polarity opposite to a stored average value. Although two input lines 10 and 12 are shown schematically, in practice input 12 is used merely as a test input. Two inputs 10 and 12 are shown to indicate sources for both information pules (line 10) and background noise (line 12) but operationally both the input information pulse and the background noise exist in a common input signal. Capacitor 20 smoothes the output from the operational amplifier 18 to minimize the effects of transients in the input signal. The time constant for the smoothing is determined by the RC value of capacitor 20 with resistor 22. The low frequency gain for amplifier 18 is equal to − (resistor 22)/(resistor 14 or resistor 16). Resistor 24 supplies the bias current for op-amp 18 while resistor 26 controls the power dissipation of the op-amp 18.

The signal out of the input conditioning stage then travels via line 28 and is conditioned by feedback circuitry which establishes an average amplitude of the input signal. The averaging circuitry is an analog to digital feedback loop consisting of a digital-to-analog (d/a) converter, an error averager, and a logic control circuit. The digital-to-analog converter includes two four bit up/down counters 30 and 32 (combining to provide one eight-bit up/down counter). The d/a converter also includes a resistor ladder network consisting of resistors 34-64, and a current to voltage converter consisting of amplifier 66, capacitor 68 and resistor 70, 72 and 74. The low frequency gain of the current-to-voltage inverter is equal to resistance 70 divided by the total resistance 36-64 of the resistance ladder network. Capacitor 68 smoothes the d/a converter output and prevent false tripping of the detector by transients caused by the counter changing states. The time constant for the smoothing operation is equal to the value of resistance 70 x capacitor 68. Resistor 72 provides input bias current for operational amplifier 66, while resistor 74 controls the power dissipation for the op-am 66.

The output from the d/a converter is connected via line 76 to the error averaging circuit, consisting of op-amp 78, resistors 80–88, and capacitor 90. Resistors 80 and 82 subtract the input on line 28 from the stored average on line 76. Resistor 84 and capacitor 90 control the gain and time constant of the error average. Resistor 86 provides the input bias current for op-amp 78, while resistor 88 controls its power dissipation.

The output from the error averager is fed through resistor 92 to the control logic circuitry which consists generally of a comparator stage and a clock output stage. The comparator determines the polarity of the output from the error averager and is comprised of resistor 92, op-amp 94, and resistors 96 and 98. As mentioned, resistor 92 conducts the average amplitude input from the error averager. Resistor 96 provides the input bias current for op-amp 94, and resistor 98 connects the op-amp 94 with flip-flop 100. The clock output stage controls the effective averaging of the detector and takes a somewhat complicated design due to possible timing problems in the feedback loop. For example, the up/down counters 30 and 32 are controlled by two signals. One is a clock signal from NOR gate 102 which commands a change in the ladder output; the second is an up/down command from flip-flop 100 which controls the direction of change. The clock logic arrangement provides a one-fourth cycle delay so that the up/-down command direction is not indeterminent when the clock commands a change in count. Following the sequence of operations, the polarity of the average error in the error averager is determined by the comparator (op-amp 94 and associated elements) and stored in flip-flop 100. One quarter of a cycle later the clock commands a change in count through NOR gate 102. The effective clocking rate of the input averager is one half of the frequency of an oscillator consisting of NOR gates 104 and 106, resistors 108 and 110, and capacitor 112. The frequency of the oscillator is approximately 0.4/(resistor 110 x capacitor 112) when resistance 108 is very much greater than resistance 110. Flip-flop 114 is designed as a divide-by-two counter which provides the desired timing relationship when used in conjunction with NOR gate 102.

The output comparator provides a threshold for the detection of an information pulse for either log or linear type systems. The difference between the stored input average on line 76 and the processed input signal on line 28 is scaled by resistors 120 and 122 and presented to amplifier 124 for comparison. The values of resistors 120, 122, and 126 and potentiometer 128 determine the threshold of the detector system. Resistor 130 provides bias current for op-amp 124 and resistor 132 connects the op-amp 124 to a logic buffer consisting of NOR gate 134.

The waveforms diagrams of FIG. 2 are given to help in understanding the operation of FIG. 1. The input signal of waveform 2a is supplied as an input to op-amp 18 of the input conditioner circuit. The 2a signal is smoothed by the conditioner circuit so that the output on line 28 is shown by waveform 2b. At the same time within the d/a converter, the output from the resistor ladder network is being fed into the current-to-voltage converter consisting of op-amp 66 and associated elements. The signal waveform entering and leaving the current-to-voltage converter is shown in waveforms 2c and 2d respectively. The difference between waveforms 2b and 2d is established by resistors 80 and 82 and averaged by the error averager consisting of op-amp 78 and associated elements. The polarity of the averaged signal from op-amp 78 is determined by op-amp 94 and stored in flip-flop 100. Counters 30 and 32 step in a direction to minimize the error of the stored average by changing the input current of waveform 2c supplied to the current-to-voltage converter (amplifier 66). The rate at which the counter 30 and 32 is driven is determined by the oscillator consisting of NOR gate 104 and 106. The output comparator 124 detects the difference between the smoothed signal 2b through resistor 122 and the stored average 2d from resistor 120, and compares the ratio of this difference to a threshold value derived from potentiometer 128 and resistor 126. An output of waveform 2f occurs whenever the difference between waveforms 2b and 2d exceeds a predetermined ratio threshold. The output waveform 2g from the buffer logic 134 is digital and is representative of the threshold occurrence. Thus, the ratio detector performs the functions of storing an average of an input signal and comparing the ratio of the input signal amplitude to its average. An advantage of this system is that it can have a very long effective averaging time. It should be noted that for a log input, the detector threshold is set by potentiometer 128 and resistor 126. Resistor 120 is equal in value to resistor 122 in this case to prevent any change in the signals 2b and 2d before comparison. In the case of linear operation, the threshold would be controlled by the ratio of resistor 120 to resistor 122 with resistor 126 and potentiometer 128 not required or, in the alternative, set for zero bias.

FIG. 3 is a timing diagram for the clocking circuit. Waveform 3a indicates the timing signal from the oscillator which is fed from NOR gate 106 to the input of flip-flop 114 and NOR gate 102. The output from flip-flop 114 to flip-flop 100 is shown in waveform 3b. Waveform 3c shows one of the inputs to counters 30 and 32 from NOR gate 102 which determines the rate at which the counters are driven. The other input to counters 30 and 32 which carries the directional information for the counter (i.e., count either up or down) is derived from the output of flip-flop 100 and is shown in waveform 3d.

Typical values for the various circuit elements given by way of illustration only are as follows:

| Element No. | Value |
| --- | --- |
| 14 | 1 Meg Ω |
| 16 | 1 Meg Ω |
| 18 | LM 4250 |
| 20 | 0.1 μf |
| 22 | 2 Meg Ω |
| 24 | 681 K Ω |
| 26 | 10 Meg Ω |
| 30 | CD4029A |
| 32 | CD4029A |
| 34 | 200 K Ω |
| 36–48 | 100 K Ω |
| 50–64 | 200 K Ω |
| 66 | L 144 |
| 68 | 0.1 μf |
| 70 | 80.6 K Ω |
| 72 | 47 K Ω |
| 74 | 3.3 Meg Ω |
| 78 | LM 4250 |
| 80–82 | 200 K Ω |
| 84 | 499 K Ω |
| 86 | 100 K Ω |

-continued

| Element No. | Value |
| --- | --- |
| 88 | 10 Meg Ω |
| 90 | 1.0 μf |
| 92 | 100 K Ω |
| 94 | L 144 |
| 96–98 | 100 K Ω |
| 100 | CD4013A |
| 102–106 | CD4001A |
| 108 | 4.7 Meg Ω |
| 110 | 2.2 Meg Ω |
| 112 | 0.22 μf |
| 114 | CD4013A |
| 120–122 | 100 K Ω |
| 124 | L 144 |
| 126 | 1 Meg Ω |
| 128 | 500 K Ω |
| 130 | 47 K Ω |
| 132 | 100 K Ω |
| 134 | CD4001A |

Thus, there has been described a ratio detector which performs the functions of storing the average of an input signal and comparing the ratio of the input signal to its average. Obviously, many modifications and variations of the present invention are possible in light of the above teachings. It is therefore to be understood that, within the scope of the appended claims, the invention may be practiced otherwise than as specifically described.

What is claimed is:

1. A ratio detector circuit for producing a gated output whenever the average amplitude of an information pulse exceeds a predetermined threshold in the presence of interfering background noise comprising:
   input conditioning means for inverting and smoothing an input signal to said detector;
   a feedback loop coupled to the output of said input conditioning means for establishing the average amplitude of said input signal and storing said average, said feedback loop comprising:
      an error averager for determining the difference in amplitude between said conditioned input signal and said stored average;
      control logic for determining the polarity of said amplitude difference and triggering an output indicative of said polarity, and for generating clocking signals to control the effective amplitude average of said detector;
      a digital to analog converter for receiving said indicative output and said clocking signals for producing an analog output of said amplitude average; and
   output comparator means for detecting the amplitude relationship between said conditional input signal and said analog average and producing a digital output whenever said relationship exceeds a predetermined ratio threshold.

2. The ratio detector circuit of claim 1 wherein said digital-to-analog converter comprises:
   an up/down counter responsive to said output from said control logic to count in a direction determined by said polarity;
   a resistor ladder network for storing said amplitude average value, said ladder network being responsive to said clocking signals to vary said ladder output; and
   current-to-voltage conversion means for converting the output current from said ladder network to a representative voltage.

3. The ratio detector circuit of claim 2 wherein said error averager comprises:
   first and second resistor of equal value connected to a first common node, said first resistor connecting said inverted input signal from said input conditioning circuit to said common node, and said second resistor connecting said stored average from said resistor ladder network to said node so that a resulting composite signal at said node represents the difference in amplitude between said input signal and said analog average; and
   a first operational amplifier for smoothing and amplifying said amplitude difference.

4. The ratio detector circuit of claim 3 wherein said control logic includes:
   a second operational amplifier for determining the polarity of said amplitude difference;
   a first flip-flop for storing an indication of said polarity;
   a solid state oscillator network for generating clocking pulses; and
   a second flip-flop responsive to said clocking pulses to release said stored polarity signal in said first flip-fop simultaneously with the occurrence of said clocking pulses, said polarity signal and said clocking pulse simultaneously being conducted to said digital-to-analog converter.

5. The ratio detector circuit of claim 4 wherein said output comparator means includes:
   third, fourth and fifth resistors connected to a second common node, said third resistor connecting said inverted input signal from said input conditioning circuit to said second common node, said fourth resistor connecting said stored amplitude average from said resistor ladder network to said second common node; and said third resistor conducting a threshold voltage to said second common node; and
   an amplifier means for comparing the ratio of said analog average amplitude value to amplitude of said conditioned input signal, and conducting an output whenever said ratio exceeds said threshold value.

* * * * *